(12) United States Patent
Besati et al.

(10) Patent No.: US 9,581,336 B2
(45) Date of Patent: *Feb. 28, 2017

(54) THERMOSTAT

(71) Applicants: DEFENDI ITALY S.R.L., Camerano (IT); Luca Pedretti, Casalino NO (IT)

(72) Inventors: Davide Besati, Biandrate NO (IT); Massimo Dugnani, Novara NO (IT); Luca Pedretti, Dormelletto NO (IT); Mauro Tappa, Confienza PV (IT); Giuseppe Valzi, Casalino NO (IT)

(73) Assignee: DEFENDI ITALY S.R.L., Camerano (IT)

( * ) Notice: Subject to any disclaimer, the term of this patent is extended or adjusted under 35 U.S.C. 154(b) by 86 days.

This patent is subject to a terminal disclaimer.

(21) Appl. No.: 14/435,169

(22) PCT Filed: Oct. 22, 2013

(86) PCT No.: PCT/IB2013/059530
§ 371 (c)(1),
(2) Date: Apr. 12, 2015

(87) PCT Pub. No.: WO2014/064605
PCT Pub. Date: May 1, 2014

(65) Prior Publication Data
US 2015/0292748 A1    Oct. 15, 2015

(30) Foreign Application Priority Data
Oct. 26, 2012    (IT) .................................. MI12A1823

(51) Int. Cl.
G05D 23/00    (2006.01)
F24C 3/12    (2006.01)
(Continued)

(52) U.S. Cl.
CPC .............. *F24C 3/128* (2013.01); *F23N 1/007* (2013.01); *F23N 5/027* (2013.01); *G05D 23/02* (2013.01);
(Continued)

(58) Field of Classification Search
CPC . F24C 3/128; G05D 23/02; F23N 1/00; F23N 3/00
(Continued)

(56) References Cited

U.S. PATENT DOCUMENTS 2,718,918 A * 9/1955 Marvin ................... F23N 5/107
                                                    137/66
3,434,694 A * 3/1969 Skinner ..................... F16K 1/04
                                                    137/315.27
(Continued)

FOREIGN PATENT DOCUMENTS

DE         3102123 A1    8/1982
DE    102006032020 A1    1/2008
(Continued)

*Primary Examiner* — Gregory Huson
*Assistant Examiner* — Nikhil Mashruwala
(74) *Attorney, Agent, or Firm* — Themis Law

(57) ABSTRACT

A thermostat for gas-powered cooking appliances includes a body having an inlet conduit and an outlet conduit that respectively receive and supply a gas flow, and a chamber in fluid communication both with the inlet conduit, and also with the outlet conduit either directly, through a main opening formed at one end thereof, or indirectly, through a secondary conduit formed in the body of the thermostat, which reaches the outlet conduit bypassing the main opening. A valve that adjusts gas flow rate is coaxially fitted in the chamber and has a position that is controlled by an expandable member of a thermostatic bulb of the thermostat. The valve is axially deformable beyond a predefined load threshold and compensates for dilations of the expandable member under a normal operating condition, absorbing axial (Continued)

forces exerted by the thermostat knob when rotated to switch off a burner driven by the thermostat.

5 Claims, 5 Drawing Sheets

(51) Int. Cl.
 *F23N 1/00* (2006.01)
 *F23N 5/02* (2006.01)
 *G05D 23/02* (2006.01)
(52) U.S. Cl.
 CPC *F23K 2900/05002* (2013.01); *F23N 2035/24* (2013.01)
(58) Field of Classification Search
 USPC .................... 126/39 G, 39 E; 431/12, 56, 62
 See application file for complete search history.

(56) References Cited

U.S. PATENT DOCUMENTS

| | | | | |
|---|---|---|---|---|
| 3,810,578 | A * | 5/1974 | Matthews | F24H 9/2085 236/80 B |
| 4,134,573 | A * | 1/1979 | Messinger | E03C 1/08 251/324 |
| 4,413,975 | A * | 11/1983 | Turner | F23N 5/105 137/599.01 |
| 5,215,115 | A * | 6/1993 | Dietiker | F16K 31/402 137/492.5 |
| 5,439,199 | A * | 8/1995 | Briggs | F16K 21/04 251/320 |

FOREIGN PATENT DOCUMENTS

| | | |
|---|---|---|
| FR | 2366616 A1 | 4/1978 |
| FR | 2875573 A1 | 3/2006 |

\* cited by examiner

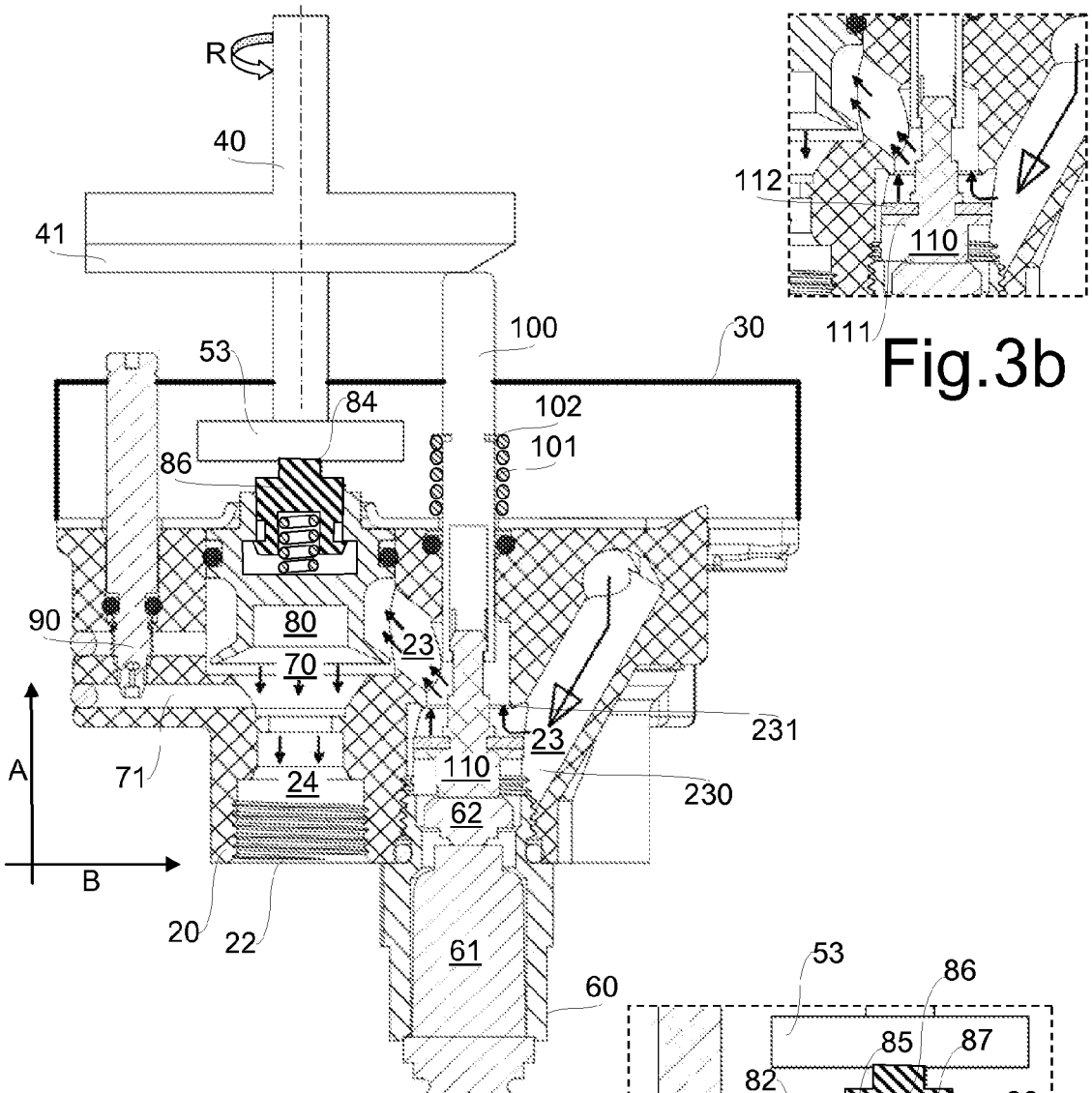
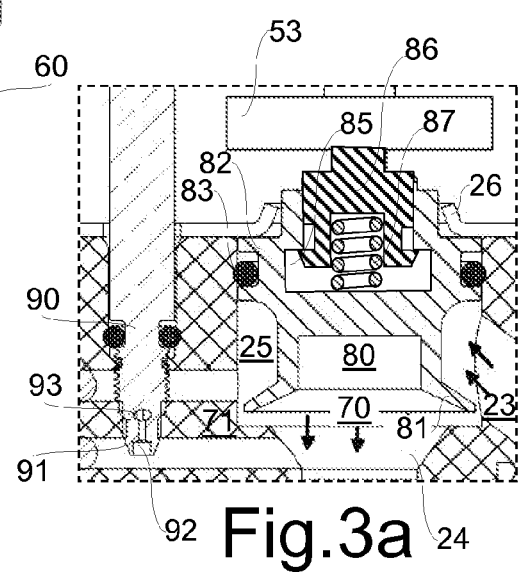
Fig.3
Fig.3a
Fig.3b

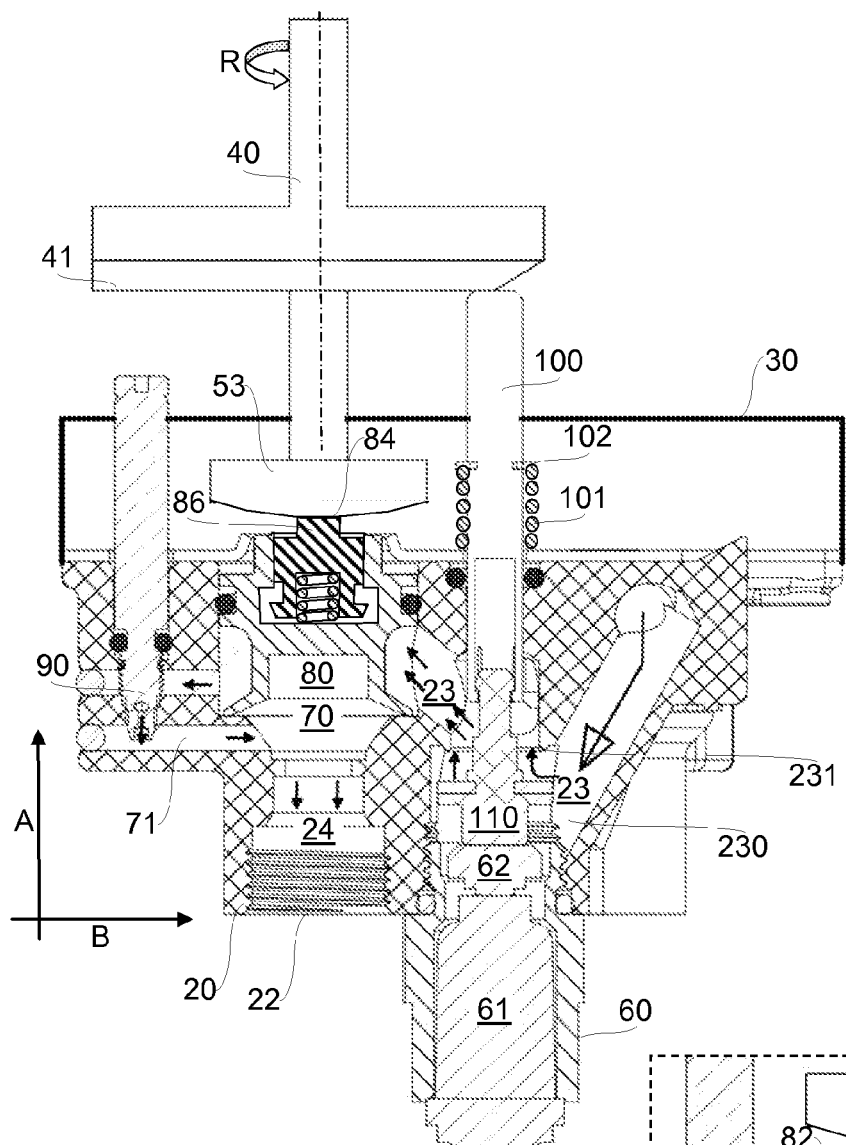
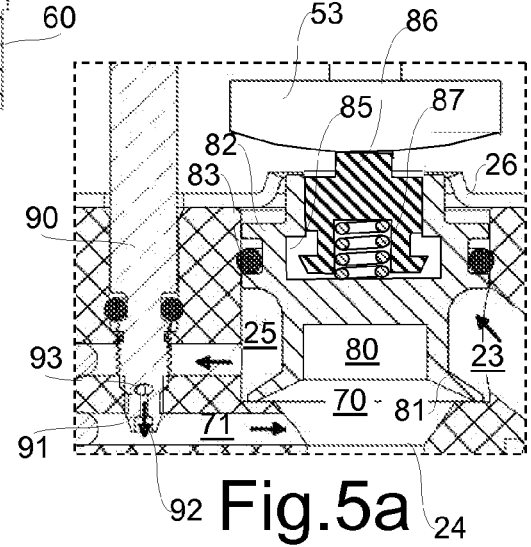
Fig.5
Fig.5a

THERMOSTAT

The present invention generally relates to the field of gas cooking appliances and in particular to a thermostat for gas cooking appliances.

Thermostats are used to maintain a desired temperature in closed compartments such as the compartment of an oven inside which a gas-fueled burner provides the thermal energy needed for cooking. Maintenance of a desired temperature is possible thanks to the use of a thermostatic bulb fitted into the heated compartment, which allows retroactive adjustment of the gas flow supplied to the burner through an expandable member operatively connected to a valve arranged within a body of the thermostat.

In the body of thermostats known in the art there is generally formed a plurality of conduits that define a first circuit for supplying gas to a nozzle generating a pilot flame and a second circuit for supplying gas to a burner. The first circuit is characterized by a predefined minimum gas flow, generally controlled by a needle valve and an adjuster screw, while the second circuit is characterized by a variable gas flow controlled by a valve which is retroactively driven by the thermostatic bulb.

When only the pilot flame is lit, the gas flows exclusively in the first circuit and the valve of the second circuit is completely closed. In a normal operation condition of the thermostat instead gas flows through both the first and the second circuits.

The desired temperature is set with the aid of a graduated scale by way of a rotatable knob, which acts on a stop member defining a maximum opening position for the valve. An expandable member of the thermostatic bulb is arranged between the valve and the stop member connected to the knob. In an operating condition of the system wherein the temperature inside the compartment increases, the expandable member of the bulb is expanded and acts on the valve by reducing the flow rate of gas supplied to the burner; on the contrary, when the temperature inside the compartment decreases, the expandable member is contracted and acts on the valve by increasing the flow rate of gas supplied to the burner. It is thus possible to achieve an operating condition of the system wherein the temperature in the heated compartment varies within a predetermined tolerance interval.

Thermostats are also known wherein a gas flow is fed directly and solely to the burner, thus eliminating the gas circuit supplying the pilot flame. To this aim, a single chamber supplied by an inlet conduit and arranged in fluid communication with an outlet conduit both through a main opening and a secondary conduit is formed in the thermostat body, the main opening and the secondary conduit being respectively designed for a maximum and a minimum flow rate of gas. Inside the chamber a valve for adjusting the rate of the gas flow is arranged, whose position in the chamber is controlled by the expandable member of a thermostatic bulb of the thermostat and causes gas to flow through the main opening or the secondary conduit toward the outlet conduit.

A thermostat of this type is e.g. disclosed in the patent application MI2012A001633, in the applicant's name. The thermostat comprises a body inside which an inlet and an outlet conduits are formed, which are respectively intended to receive a flow of gas from a supply source and to supply the gas flow to a burner, as well as a chamber having a substantially cylindrical shape arranged in fluid communication with the inlet conduit. The chamber is also arranged in fluid communication with the outlet conduit directly, through a main opening formed at one end thereof, as well as through a secondary conduit formed in the body of the thermostat, which reaches the outlet conduit bypassing the main opening. The main opening and the secondary conduit are respectively sized for a maximum and a minimum flow rate of gas.

The thermostat further comprises a valve for adjusting the gas flow rate, the valve being arranged inside the chamber. The valve is movable coaxially to the chamber between a first position wherein the main opening is completely clear, thus allowing passage of a flow of gas towards the outlet conduit, and a second position wherein the main opening is completely closed by the valve and the gas flow reaches the outlet conduit through the secondary conduit only. The valve has a substantially cylindrical shape and comprises a pair of flanges formed at its free ends; a first flange faces the main opening of the chamber and has a diameter suitable to close it in the second position, while a second flange closes the chamber at the opposite end and is provided with a circumferential groove wherein a sealing member of the valve may be fitted in order to prevent gas leakages from the chamber. The valve is urged in the first position by a spring fitted in the chamber at the main opening.

In a normal operating condition, the position of the valve is controlled by an expandable member of a thermostatic bulb. In this condition the thermostat operates at a minimum flow rate with the main opening substantially closed by the valve.

Another example of a thermostat wherein the position of the valve is controlled by the expandable member of a thermostatic valve is disclosed in the French patent publication FR 2366616 A1.

A problem of this type of thermostats is that operation failures and even damages may occur at temperatures that are beyond the normal operating temperature. In fact, when the valve contacts the main opening for the gas flow, possible dilations of the expandable member due to temperature increases that cannot be foreseen may result in permanent deformations of the expandable member or even cause its break, which would lead to leakages of the fluid contained therein and to damages of the parts of the thermostat close to the expandable member.

A similar technical problem may occur when switching the burner off. In this case, starting from a normal operating condition wherein the valve substantially closes the main opening, it is necessary to rotate the driving knob of the thermostat in order to bring it in the off position, thus determining an axial compression of the components that are arranged in series below it, among which the expandable member of the thermostatic bulb contacting the valve.

It is therefore an object of the present invention to provide a thermostat allowing to overcome these drawbacks. Said object is achieved with a thermostat whose main features are specified in the first claim, while other features are specified in the remaining claims.

An idea of solution underlying the present invention is to make a thermostat that is structurally similar to the thermostat disclosed in the patent application MI2012A001633 in the applicant's name, and wherein the valve arranged in the chamber formed in the body of the thermostat is axially deformable beyond a predefined load threshold. The load threshold is calculated with reference to the spring urging the valve in the first opening position, and is higher than the maximum reaction force said spring may provide when the valve is in the second, closing position, thus allowing to compensate for dilations of the expandable member beyond the dilation determined by the maximum temperature the thermostatic bulb can withstand. This configuration also allows the valve to absorb axial forces consequent to the rotation of the thermostat knob when switching off the burner driven by the thermostat, thus minimizing the risk that such forces damage the expandable member of the thermostatic bulb.

Thermostats provided with valves that are axially deformable are already known in the field, e.g. from the German patent publication DE 102006032020 A1. However, the axially deformable valve described in this document is not driven by a thermostatic bulb, but through a cam formed on a toothed wheel, and serves as a switch allowing opening and closing of a gas conduit. The stroke of a valve stem is greater than the distance between is closing edge and the aperture through which gas may flow, so that the axial deformability of the valve is used to ensure complete closure of the gas conduit. This solves a technical problem that is completely different from the technical problem of the invention and unrelated thereto.

A further example of a thermostat provided with an axially deformable valve is described in the French patent publication FR 2875573 A1. Also in this case the axially deformable valve does not contact the expandable member of a thermostatic bulb, but a linear actuator and an electromagnet driving the linear actuator that control the position of the valve. The axial deformability of the valve serves to ensure compensation of the plays between the magnetic cores allowing its axial movements.

In other words, the invention does not lie in the choice of an axially deformable valve for adjusting a gas flow, but in the combination between an axially deformable valve and the expandable member of a thermostatic bulb in order to provide a thermostat with a mechanical safety device suitable to preserve the expandable member of the thermostatic bulb when subject to loads that are higher than the loads characterizing the normal operating condition of the thermostat.

The axial deformability of the valve is preferably obtained by forming an axial cavity in its body and fitting therein an axially movable member urged away therefrom by a spring or equivalent elastic means. The elastic means are sized so as to intervene beyond a predefined load threshold, corresponding to the maximum force the spring urging the valve in the first opening position may exert. Hence, under normal operating conditions the valve behaves like a rigid body, whereas when the predefined load threshold is exceeded, the valve is axially deformed thus allowing to absorb dilations of the expandable member beyond those characterizing the normal operation of the thermostat and/or the axial forces exerted when switching off the burner.

This configuration allows to implement the invention in a very simple and cheap way by starting from a one-piece valve already employed in the same type of thermostat.

Further advantages and features of the thermostat according to the present invention will become clear to those skilled in the art from the following detailed and non-limiting description of an embodiment thereof with reference to the attached drawings in which:

FIG. 3 is a longitudinal sectional view similar to that of FIG. 2, which schematically shows the thermostat in a normal operating condition;

FIGS. 3a and 3b show details of FIG. 3;

FIG. 5 is a longitudinal sectional view similar to those of FIGS. 2, 3 and 4, which schematically shows operation of the deformable valve; and FIG. 5a shows a detail of FIG. 5.

Figure 1:
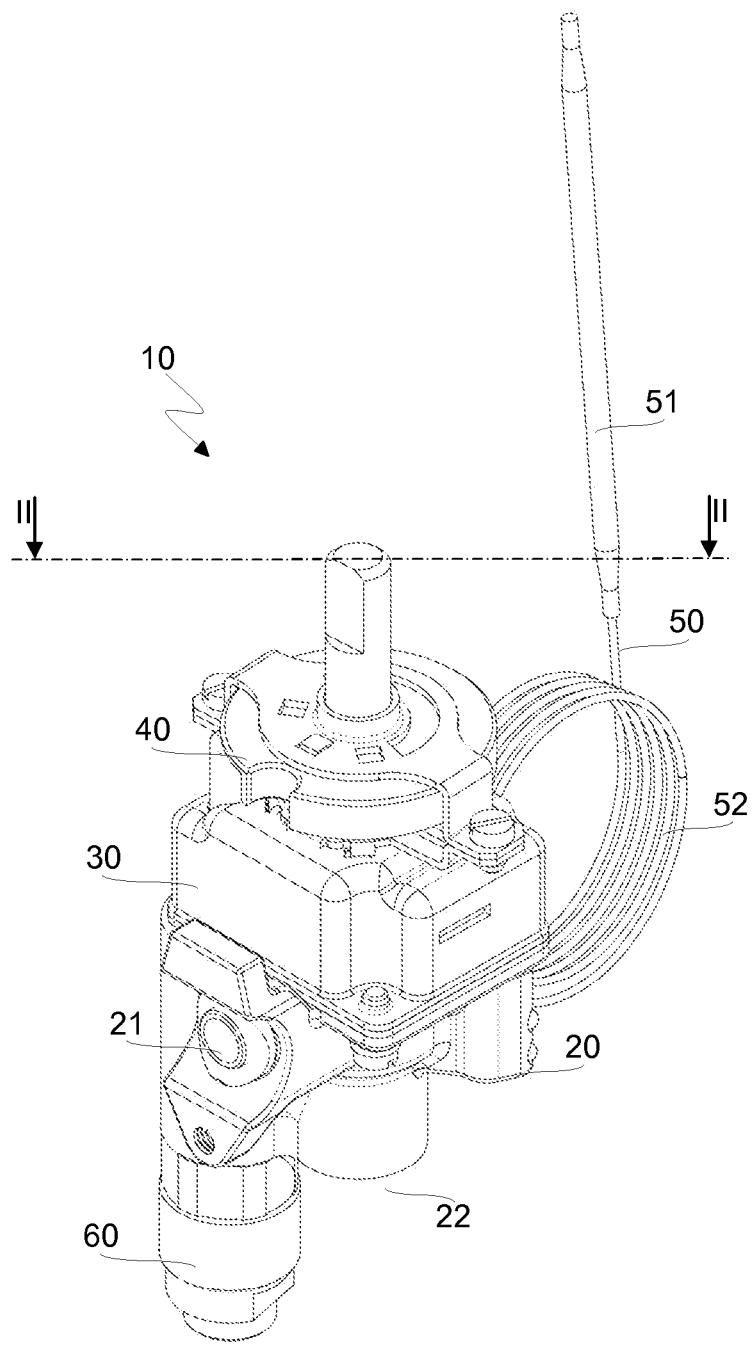
FIG. 1 is a perspective view showing a thermostat according to the invention.

Referring to FIG. 1, the thermostat 10 according to the invention comprises a body 20 inside which a plurality of conduits suitable to supply a gas flow to a burner (not shown) from an inlet opening 21 to an outlet opening 22 are formed. The inlet opening is intended to be connected to a gas supply, while the outlet opening is intended to be connected to the burner through suitable conduits.

The thermostat 10 also comprises a bell-shaped cover 30 fixed to the body 20, for example by way of screws, which rotatably supports a coupling member 40 configured to allow mounting of a knob (not shown) for ignition of the burner and temperature adjustment.

The thermostat 10 further comprises a thermostatic bulb 50 equipped with a probe 51 meant to be inserted in a compartment to be heated, e.g. the compartment of an oven. A conduit 52 filled with a thermally expandable fluid medium, e.g. a diathermic oil, is connected to the probe 51 of the thermostatic bulb 50. The thermostatic bulb 50 also comprises in known manner an expandable member 53 (shown in FIGS. 2 to 5 and in their respective details 2a to 5a), which is connected to the conduit 52 at the end thereof opposite to the end at which the probe 51 is fixed. The expandable member is housed within the bell-shaped cover 30. The expandable member 53 is preferably of a membrane type, whose flat shape allows to limit the overall dimensions of the thermostat 10.

As it will be described in detail below with reference to FIGS. 2 to 5, the expandable member 53 of the thermostatic bulb is operably connected to a valve of the thermostat 10, which allows to adjust of the gas flow within its body 20.

The thermostat 10 further comprises a thermoelectric safety device 60 suitable to block the gas flow through the body 20 when voluntarily switching the burner off or when the burner flame is accidentally extinguished.

Now referring to FIGS. 2 to 5, an inlet conduit 23 and an outlet conduit 24 are formed in the body 20 of the thermostat 10 and respectively adapted to receive a gas flow from a supply source (not shown) and to supply the gas flow to a burner (not shown). The thermoelectric safety device 60 is operatively connected to the inlet conduit 23 and crosses it at an elbow portion 230 thereof, which is formed in a shoulder 231 adapted to receive in abutment a closure member operatively connected to the thermoelectric safety device 60.

A chamber 25 having a substantially cylindrical shape is formed inside the body 20 of the thermostat 10 and arranged in fluid communication with the inlet conduit 23.

The chamber 25 is also arranged in fluid communication with the outlet conduit 24 through a main opening 70, as well as through a secondary conduit 71 formed in body 20 of the thermostat, which reaches the outlet conduit 24 bypassing the main opening 70.

The main opening 70 and the secondary conduit 71 are respectively sized for a maximum and a minimum flow rate of gas.

A valve 80 for the regulation of the flow rate of the gas flow is arranged inside the chamber 25. The valve 80 is movable coaxially to the chamber 25 from a first, maximum opening position, wherein the main opening 70 is completely clear allowing passage of a gas flow to the outlet conduit 24, to a second, closing position wherein the main opening 70 is completely closed by the valve and the gas flow reaches the outlet conduit 24 through the secondary conduit 71. The movement of the valve 80 between the first and the second positions thus determines the flow rate of the gas supplied to the burner, which ranges from a maximum to a minimum flow rate, thus allowing to achieve a range of temperatures within the compartment to be heated.

In the illustrated embodiment, an axis of the chamber 25 is oriented in a first direction A of the body 20 of the thermostat 10 and the inlet conduit 23 is connected to the chamber 25 through an opening formed in its peripheral wall.

The main opening 70 is formed at one end of the chamber 25 in the first direction A so as to allow fluid communication with the outlet conduit 24 in the same direction A. Hence, the chamber 25, the main opening 70 and the outlet conduit 24 are arranged in series.

The secondary conduit 71 is instead connected to the chamber 25 through an opening formed in its peripheral wall and has a U-shape whose straight branches extend parallel to one another transversely to the chamber 25 in a second direction B of the body 20 the thermostat 10 perpendicular to the first direction A, and are connected together by an elbow portion extending in the first direction A.

The secondary conduit 71 so configured connects the chamber 25 with the outlet conduit 24 downstream of the main opening 70 with respect to the direction of the gas flow through the body 20 of the thermostat 10. This configuration allows to supply gas to the burner at a minimum flow rate when the valve 80 is in the closing position.

The valve 80 has a substantially cylindrical shape and comprises a pair of flanges 81, 82 formed at its ends. In the illustrated embodiment, a first flange 81 faces the main opening 70 of the chamber 25 which communicates with the outlet conduit 24 and has a diameter suitable to close it in the closing position of the valve 80, while a second flange 82 closes the chamber 25 at the opposite end and to this aim it is provided with a circumferential groove wherein a sealing element 83 of the valve 80 suitable to prevent gas leakages may be fitted.

The diameter of the portion of the valve 80 comprised between the two flanges 81, 82 is smaller than the diameter of the chamber 25 and defines a volume therewith having a substantially toroid shape suitable to allow passage of the gas supplied from the inlet conduit 23.

At the end of the chamber 25 opposite to the end at which the main opening 70 is formed, a flat lid 26 partially closing the chamber 25 is fixed to the body 20 of the thermostat 10. The flat lid 26 restricts the movement of the valve 80 coaxially to the chamber 25 and therefore determines the maximum opening position.

The valve 80 comprises a drive portion 84 formed on the flange 82 which closes the chamber 25 at the end opposite to the end at which the main opening 70 is formed. In an assembled configuration of the thermostat 10, the valve 80 is urged by a helical spring (not shown) away from the main opening 70 in the first direction A, hence towards the first, opening position, and the drive portion 84 protrudes from the body 20 through a circular opening formed in the lid 26 thus pressing against the expandable member 53 of the thermostatic bulb 50. As it will be better described below, this configuration allows to control the normal operation of the thermostat.

In FIGS. 2 to 5, the gas flow through the body 20 of the thermostat 10 is schematically shown by way of a plurality of arrows.

Figures 2, 2A:
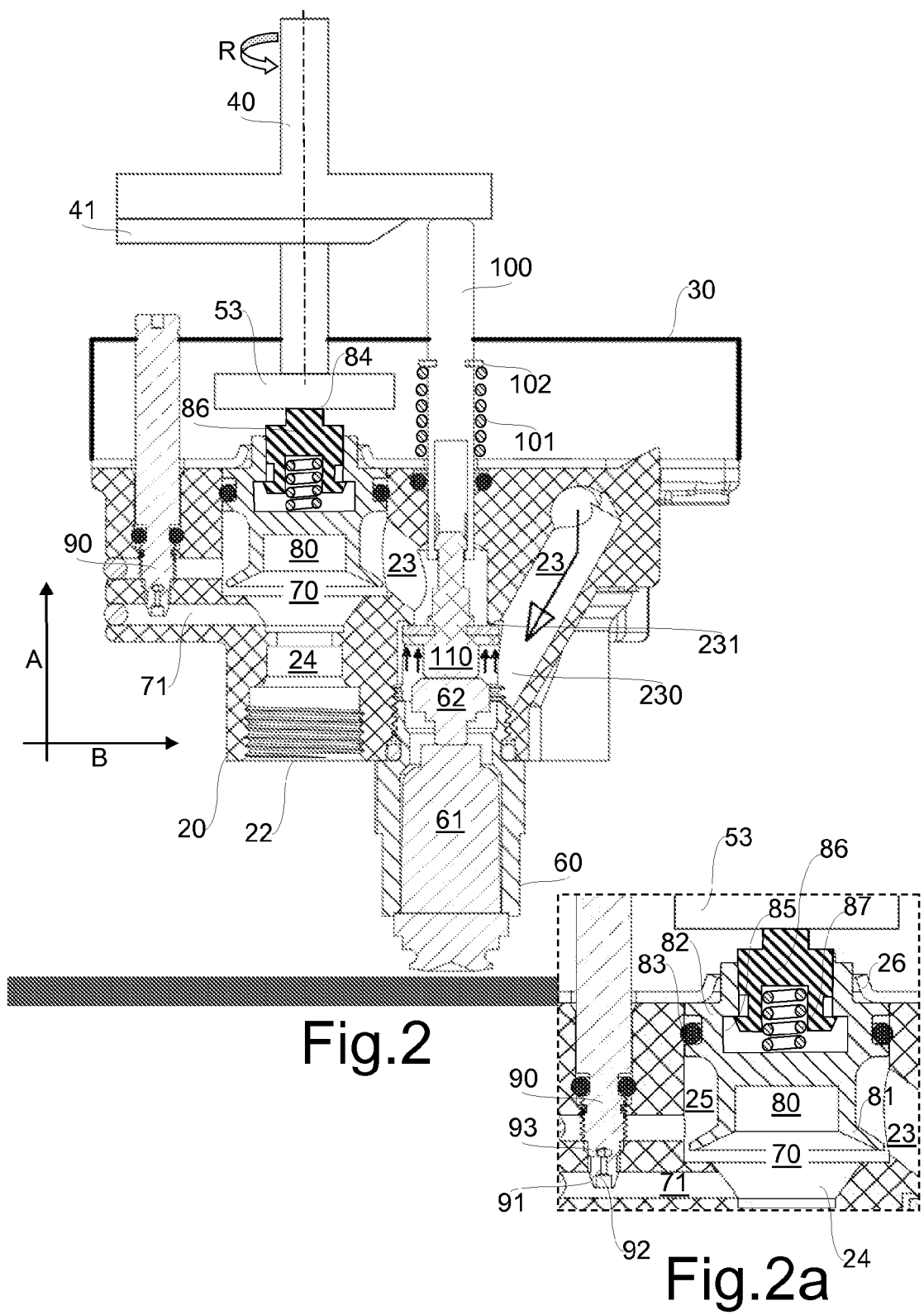
FIG. 2 is a longitudinal sectional view taken along line II-II of FIG. 1, which schematically shows the thermostat in an operating condition wherein no gas flow is allowed.
FIG. 2a shows a detail of FIG. 2.

FIG. 2 shows a non-operating condition of the thermostat 10, wherein the thermoelectric device 60 is in a blocking condition that prevents a flow of gas from entering the chamber 25.

FIG. 3 instead shows an operating condition of the thermostat, wherein the valve 80 is spaced from the opening 70 and arranged in the maximum opening position. In this operating condition the gas supplied from the inlet pipe 23 fills the chamber 25 and flows into the outlet conduit 24 through the main opening 70 passing around the flange 81.

Figures 4, 4A:
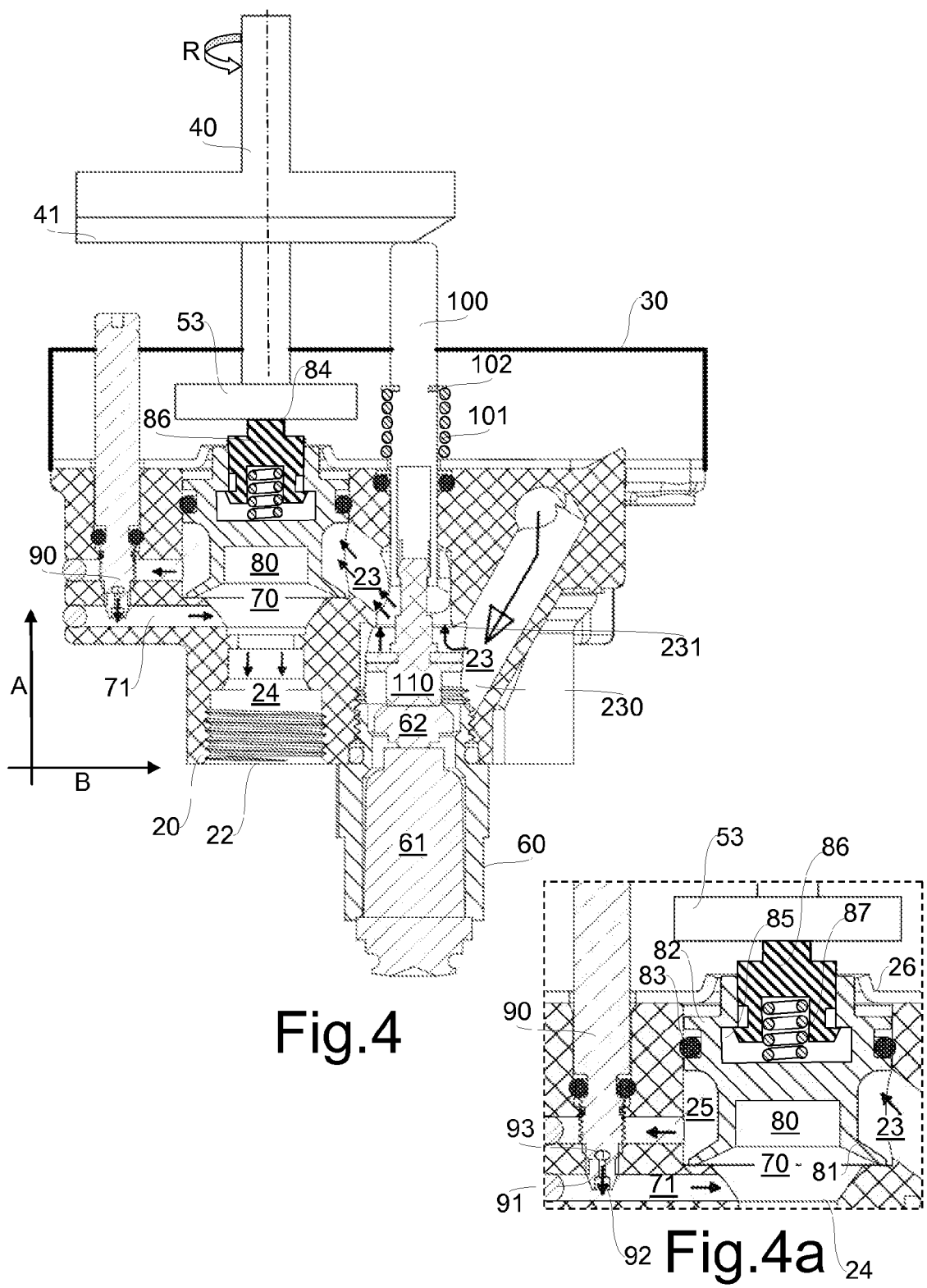
FIG. 4 is a longitudinal sectional view similar to those of FIGS. 2 and 3, which schematically shows the thermostat in an operation condition at a minimum flow of gas.
FIG. 4a shows a detail of FIG. 4.

In positions of the valve 80 comprised between the maximum opening position and the closing position, the gas flow rate through the main opening 70 is progressively reduced and in the closing position the gas that fills the chamber 25 flows at a minimum flow rate solely through the secondary conduit 71. This operating condition at a minimum flow rate is shown in FIG. 4.

The minimum flow rate of gas in the secondary conduit 71 can advantageously be adjusted by means of a valve, for example a needle valve controlled by way of an adjuster screw.

In the illustrated embodiment a needle valve 90 is shown fitted in a partially threaded hole formed in the body 20 of the thermostat in the first direction A; the needle valve is provided with a suitable sealing element, such as an O-ring.

The needle valve 90 crosses the secondary conduit 71 at its elbow portion, which to this aim has a frustum-conical shape adapted to receive in abutment a corresponding frustum-conical end portion 91 of the needle valve 90. This configuration is advantageous, because it provides more room for housing the needle valve 90.

The needle valve 90 of the thermostat 10 according to the invention also comprises an axial hole 92 formed at its frustum-conical end portion 91 and a plurality of radial holes 93, e.g. four holes, formed in the cylindrical portion immediately adjacent the frustum-conical end portion 91 and arranged in fluid communication with the axial hole 92, thus allowing fluid communication through the secondary conduit 71 also when the frustum-conical portion 91 of the needle valve 90 abuts the frustum-shaped elbow portion. Hence, this configuration always ensures passage of a gas flow through the secondary conduit 71, and then operation at a minimum flow rate of a burner connected to the thermostat 10 according to the invention.

In a normal operating condition of the thermostat 10, a user sets a desired temperature with the aid of a graduated scale by acting on a knob (not shown) connected to the rotatable coupling member 40. The rotation direction of the rotatable coupling member 40 is schematically shown in FIGS. 2 to 4 by an arrow R.

As explained above, the rotatable coupling member 40 acts on the valve 80 through the expandable member 53 of the thermostatic bulb 50 and when it is rotated by a user in order to set a desired operating temperature it defines a maximum opening position for the valve 80. Under normal operating conditions, i.e. once reached a desired temperature, if the temperature inside the heated compartment increases, the expandable member 53 of the thermostatic bulb 50 is expanded thus pressing against the drive portion 84 of the valve 80. Consequently the valve 80 is moved towards the main opening 70 of the chamber 25 thus reducing the flow rate of the gas supplied to the burner and lowering the temperature.

When the temperature inside the heated compartment instead decreases, the expandable member 53 of the thermostatic bulb 50 is contracted thus allowing a higher opening of the valve 80, which is urged in the opening position by a spring, thus increasing the flow rate of the gas supplied to the burner and consequently raising the temperature. In this way it is possible to obtain an operating condition of the system wherein the temperature in the heated compartment varies in a predetermined tolerance range relative to a desired value set by the user.

According to the invention the valve 80 is axially deformable beyond a predefined load threshold. The load threshold is calculated with respect to the helical spring urging the valve in the first, opening position and is higher than the maximum reaction force that this spring can exert when the valve is in the second, closing position, i.e. in an operating condition characterized by a minimum flow rate as shown in FIGS. 4 and 4a, thus allowing to compensate for dilations of the expandable member 53 of the thermostatic bulb 50, as well as to absorb axial forces exerted upon rotation of the knob of the thermostat 10 when switching off the burner driven by the thermostat.

As shown in FIGS. 2 to 5, according to an embodiment of the invention the axial deformability of the valve 80 is obtained by forming an axial cavity 85 in its body and fitting therein a member 86 axially movable relative to the valve 80.

The movable member 86 is urged by elastic means away from the valve. In the illustrated embodiment the elastic means consist of a helical spring 87, but it is clear that elastic members made of rubber and other polymeric materials may also be used, as well as elastic membranes and other equivalent means.

The elastic means are dimensioned so as to be deformed only beyond a predefined load threshold, corresponding to the maximum force the helical spring urging the valve 80 in the first, opening position may exert. Hence, during normal operation of the thermostat, the valve 80 behaves like a rigid body, whereas when the load threshold is exceeded the valve undergoes axial deformation thus allowing to absorb dilations of the expandable member 53 that are greater than those characterizing the normal operation of the thermostat 10 and/or axial forces exerted when switching the burner off.

FIGS. 5 and 5a show operation of the valve 80 when the axial loads applied thereon exceed the predefined load threshold. In particular, these figures show a condition wherein the expandable member 53 of the thermostatic bulb 50 is dilated when the thermostat 10 operates with a minimum flow rate of gas.

As it may be seen, once the predefined load threshold is exceeded, the helical spring 87 yields and is axially deformed causing the movable member 86 to move within the cavity 85 toward the valve 80. The height if the valve 80 is consequently reduced with respect to the height it has during normal operation of the thermostat 10.

As explained above, the thermostat 10 is also provided with a thermoelectric safety device 60. This device comprises in known manner an electromagnet 61 controlled by a thermocouple (not shown). The electromagnet 61 is provided with a plate member 62 movable from an unlocking position to a blocking position respectively to open or close the inlet conduit 23 of the gas. The movable plate member 62 is urged by a spring (not shown) away from the electromagnet 61. When the thermocouple is heated by the flames of the burner, due to the well-known Seebeck effect the electromagnet 61 is electrically supplied and generates a force on the plate member 62 opposing the force of the spring biasing it, thus causing opening of the inlet conduit 23 of the gas, that enters the chamber through the inlet opening 21 formed in the body 20 of the thermostat 10. When the thermocouple cools down due to intentional or accidental switch off of the burner flames, the electromagnet 61 is no longer electrically supplied and releases the plate member 62 which closes the inlet conduit 23 of the gas urged by the spring biasing it.

As it is known, in order to ignite a burner connected to a thermostat provided with a thermoelectric safety device, it is necessary to manually unlock the thermoelectric safety device by typically pressing the knob to the body of the thermostat and maintaining this position until the thermocouple supplies electromagnet with a current sufficient to keep the inlet conduit of the gas open. To this aim, a drive rod is typically inserted in a hole formed in the body of the thermostat and arranged below the knob. The drive rod extends from the knob to the plate member of the electromagnet of the safety device, thus allowing unlocking of the latter by pressing on the knob.

The drive rod is urged towards the knob typically by an helical spring.

The drive rod 100 of the thermoelectric safety device 60 acts on the plate 62 of the electromagnet 61 through a thrust member 110 telescopically inserted therein and urged away therefrom by a spring (not shown).

In an assembled configuration of the thermostat 10, the thrust member 110 is arranged in the inlet conduit 23 at the shoulder 231 formed in the elbow 230 and contacts the movable plate member 62 of the electromagnet 61. The thrust member 110 includes a flange 111 provided with a gasket 112 dimensioned so as to seal the inlet conduit 23 by pressing against the shoulder 231 when the electromagnet 61 is not powered by the thermocouple. The drive rod 100 is driven by the rotatable coupling member 40 of the knob and is urged towards it by a spring 101 arranged between the flat lid 26 of the body 20 of the thermostat 10 and a retaining ring 102 axially restrained to the drive rod 100 in correspondence with a circumferential groove formed therein.

To this aim the rotatable coupling member 40 comprises a cam profile 41 formed on the surface facing the drive rod 100 and configured so as to engage the latter only beyond a certain rotation angle of the knob fixed to the rotatable coupling member 40 in the direction indicated by the arrow R, thus making the thermostat 10 inherently reliable also in case of accidental rotation of the knob. In the illustrated embodiment, the cam profile 41 is for example configured to act on the drive rod 100 beyond a rotation angle corresponding to 52°.

The embodiment of the invention above described and illustrated is just an example susceptible of numerous variants. For example, the deformable structure of the valve 80 might be obtained by dividing the valve in two portions telescopically movable relative to each other between which elastic members are arranged. Alternatively, the valve 80 might comprise a portion made of an elastically deformable material, such as e.g. rubber.

What is claimed is:

1. A thermostat (10) for cooking appliances supplied by gas, said thermostat (10) comprising:
   a body (20) within which there are formed,
   an inlet duct (23) and an outlet duct (24), respectively configured to receive a gas flow from a supply source and to supply the gas flow to a gas burner, and
   a chamber (25) of a cylindrical shape disposed in fluid communication with said inlet duct (23), wherein said chamber (25) is also disposed in fluid communication with said outlet duct (24) either directly, through a main opening (70) formed at one end thereof, or indirectly, through a secondary duct (71) formed in the body (20) of the thermostat (10) and flowing into the outlet duct (24) bypassing said main opening (70), said main opening and secondary duct (70, 71) being respectively dimensioned for a maximum and a minimum flow rates of gas;

a valve (80) arranged in the chamber (25) and configured to regulate flow rate of the gas, wherein the valve (80) is movable coaxially to the chamber (25) in a first direction (A) of the body (20) between a first, maximum opening position, wherein the main opening (70) is completely clear thus allowing passage of the gas flow towards the outlet duct (24), and a second, closing position, wherein the main opening (70) is completely closed by the valve (80) and the gas flow reaches the outlet duct (24) through the secondary duct (71) only, the valve (80) being urged in said first, opening position by a helical spring fitted in the chamber (25) at the main opening (70); and a thermostatic bulb (50) with an expandable member (53), the position of the valve being controlled by the expandable member (53) of the thermostatic bulb (50) of the thermostat (10), the expandable member (53) contacting the valve (80) at an end opposite to an end on which the helical spring acts, wherein the valve (80) is configured to be axially deformable beyond a predefined load threshold, said load threshold being higher than a maximum reaction force that the helical spring urging the valve (80) towards the first, opening position exerts when the valve (80) is in the second, closing position.

2. The thermostat (10) according to claim 1, wherein the valve (80) comprises an axial cavity (85) and a movable member (86) movably fitted in said cavity (85), said movable member (86) being urged away from the valve (80) by an elastic member.

3. The thermostat (10) according to claim 2, wherein said elastic member comprises an helical spring (87).

4. The thermostat (10) according to claim 1, wherein the axially deformable valve (80) comprises two portions that are telescopically movable relative to each other, and an elastic member arranged therebetween.

5. The thermostat (10) according to claim 1, wherein the axially deformable valve (80) comprises a portion made of an elastically deformable material.

* * * * *